No. 821,481. PATENTED MAY 22, 1906.
O. GOODWIN.
KITCHEN CABINET.
APPLICATION FILED OCT. 31, 1905.
4 SHEETS—SHEET 1.

Witnesses:
W. H. Onrand
J. W. Lester

Inventor
Oscar Goodwin
By
Attorneys

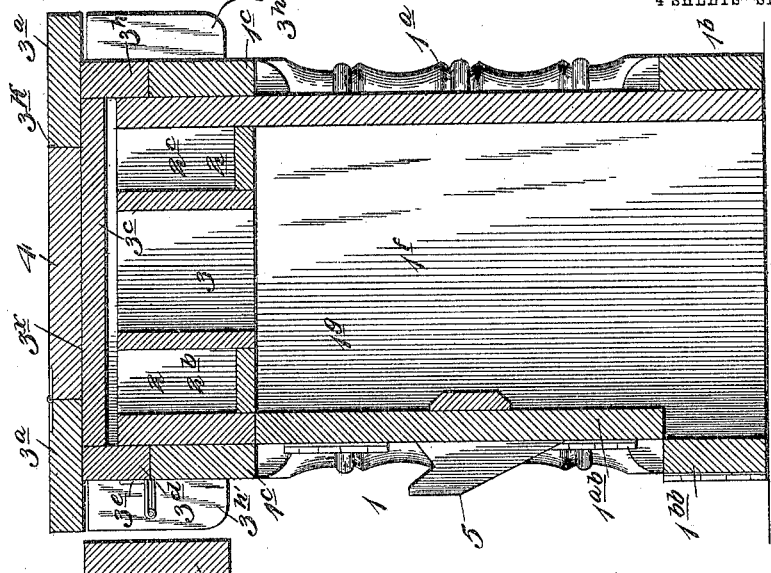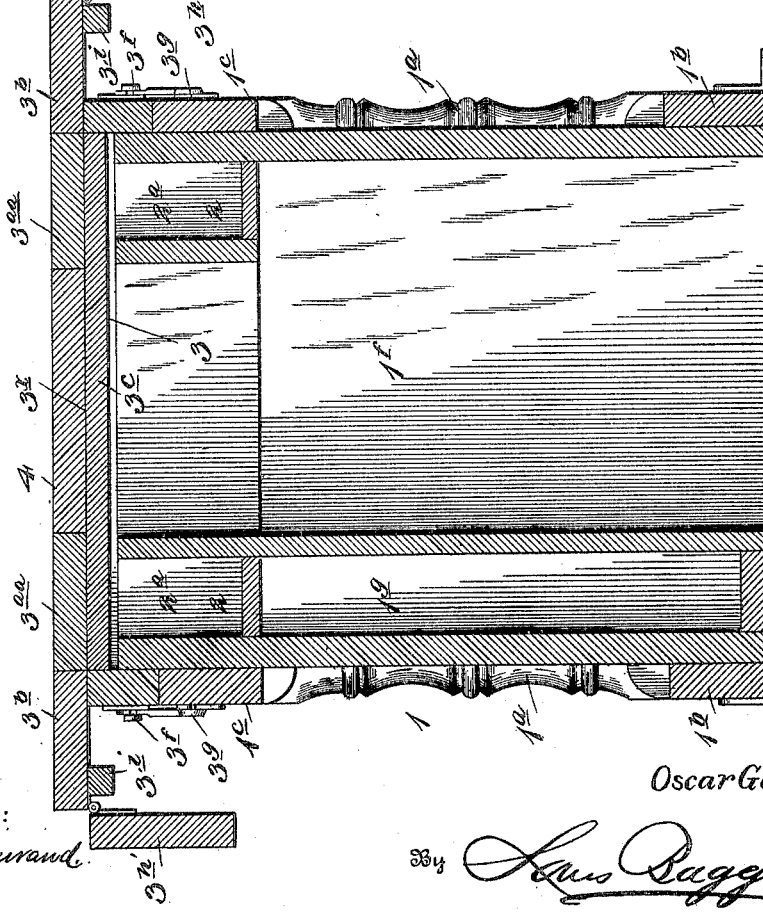

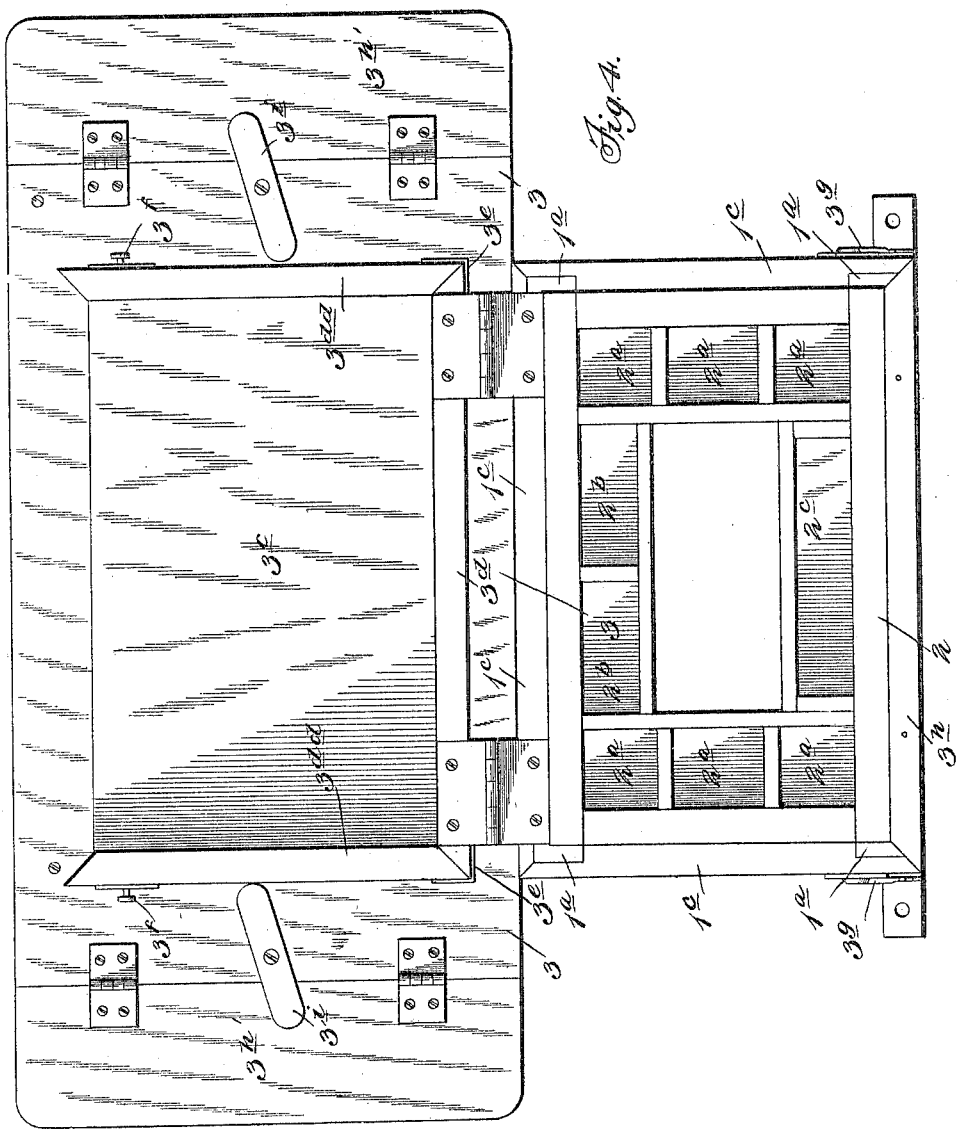

No. 821,481. PATENTED MAY 22, 1906.
O. GOODWIN.
KITCHEN CABINET.
APPLICATION FILED OCT. 31, 1905.

4 SHEETS—SHEET 4.

Witnesses:
W. H. Ourand
J. W. Foster

Inventor:
Oscar Goodwin,
By Louis Bagger & Co.,
Attorneys

UNITED STATES PATENT OFFICE.

OSCAR GOODWIN, OF BERLIN MILLS, NEW HAMPSHIRE, ASSIGNOR OF ONE-HALF TO J. HOWARD WIGHT, OF BERLIN, NEW HAMPSHIRE.

KITCHEN-CABINET.

No. 821,481.  Specification of Letters Patent.  Patented May 22, 1906.

Application filed October 31, 1905. Serial No. 285,276.

*To all whom it may concern:*

Be it known that I, OSCAR GOODWIN, a citizen of the United States, residing at Berlin Mills, in the county of Coos and State of New Hampshire, have invented new and useful Improvements in Kitchen-Cabinets, of which the following is a specification.

My invention relates to improvements in what may be termed "kitchen-cabinets."

As suggested, objects of the invention are principally for kitchen conveniences and conducting culinary operations. Among these may be noted facilities for bread-making and for suitably storing a barrel or barrels of flour, together with the rolling-pin, the "bread-tins," and the usual cookery utensils, as well as serving as a kneading or bread board.

To these ends said invention consists of certain structural features substantially as hereinafter fully disclosed, and specifically pointed out by the claims.

Figure 1:
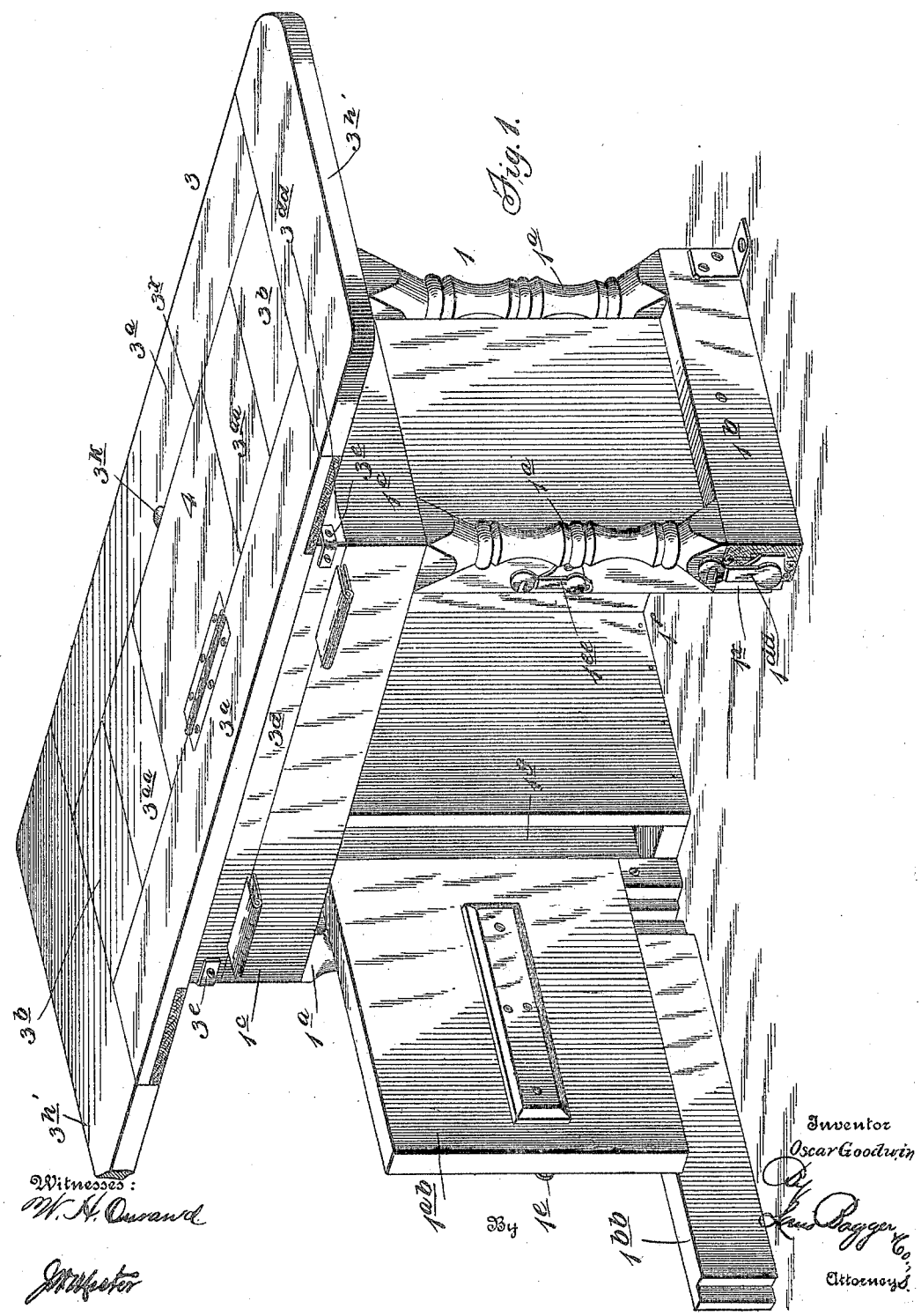
Figure 5:
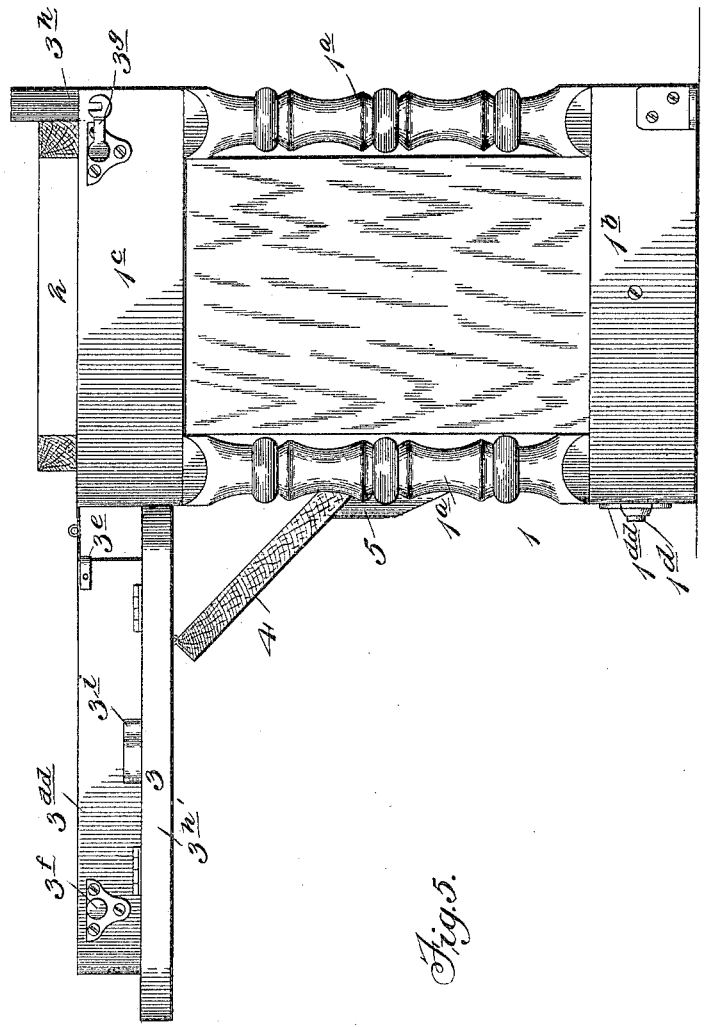

In the accompanying drawings, illustrating the preferred embodiment of my invention, Figure 1 is a perspective view thereof with the doors to the compartments for receiving the barrel of flour and bread-tins shown in open position. Fig. 2 is a vertical longitudinal section, and Fig. 3 is a vertical transverse section of the same. Fig. 4 is a plan view thereof with the parts in position as when the cabinet is used for kneading or making bread. Fig. 5 is an end elevation of the cabinet with the parts in the position indicated in Fig. 4.

In carrying out my invention I provide a suitable casing or inclosure 1, preferably rectangular in general outline and which has at its corners preferably "turned" or configurated posts $1^a$. The latter are rabbeted and secured in position to the upper and lower end pieces and the upper and lower longitudinal rear pieces and to the upper front longitudinal piece of top and bottom frames $1^b$ $1^c$, to which are also secured the parts of the casing or inclosure proper, 1, a short distance below the upper end of the latter for a purpose presently seen. The bottom or base frame $1^b$ proper is constituted of but three pieces, an otherwise fourth piece $1^{bb}$ having one end hinged to an end piece of said frame and its other end fitting into a mortise or rabbet $1^x$ in the opposite corner-post and equipped with a stud or catch $1^d$, engaged and suitably retained by a hook $1^{dd}$, applied to said corner-post, so as to permit the movement of said piece $1^{bb}$ as a door, the purpose of which will be presently apparent. Similarly an otherwise wall-forming portion $1^{ab}$ of the casing proper is hinged at a vertical edge thereof to the opposite edge of an end wall of said casing and equipped with a stud or catch $1^e$, engaged by a hook $1^{ee}$, thus providing for the movement of the part $1^{ab}$ also as a door for access to the interior of the casing. Said casing has a supplemental compartment $1^g$ separate from its main chamber or interior portion $1^f$, the same being formed by securing therein a vertical partition and a horizontal piece secured to one side of said vertical piece near its lower edge and to the opposite inner surfaces of the nearer side and back of said casing, thus constituting the bottom of such supplemental chamber or compartment. Said main chamber is designed to receive or contain a barrel or barrels of flour, while said supplemental chamber or compartment is appropriated for holding the bread-tins. The hinged section or door $1^{bb}$, which, together with the main door $1^{ab}$, is opened when the barrel or barrels of flour are to be placed in the casing 1, permits the "wheeling" of said barrel or barrels along the floor into said casing, thus obviating the necessity of lifting the same thereinto, as would otherwise be required. Of course access may be had to the flour in the barrel or barrels in removing it in quantities as wanted by simply opening said main door. Also in removing the bread-tins and replacing the same it is only required to open said main door.

In the upper portion of the casing 1 and opening out through the upper end thereof numerous suitably-arranged or devised preferably cell-like compartments 2 are provided for holding various spices, as at $2^a$, cake-cutters, as at $2^b$, and a "rolling-pin," as at $2^c$, and like utensils used in cookery or preparing pastry, &c. A hinged closure or top 3 for the upper end of the casing 1, which accordingly serves as a common cover for all of said upper cell-like compartments, is constituted generally of pieces of material suitably assembled and secured together, preferably as shown. It is noted that any assemblage of pieces or parts will answer the purpose of forming said top, which will result not only in constituting the latter, but also adapt the same to serve when in open position or inverted as a kneading or bread board. As herein shown, the combined top and flour or kneading board is composed principally of two longitudinal pieces or members $3^a$ and two end pieces $3^b$, mortised or rabbeted and otherwise secured together, and a central member or part $3^c$, forming the flour or kneading board proper, which latter is, however, secured to the inner surface of the aforesaid members, and therefore initially leaving a space or recess $3^x$, bounded by the inner edges of the aforesaid members or parts. Said recess $3^x$ is partially filled in by inserting therein reinforcing-pieces $3^{aa}$ and so as to leave the central portion of said recess unoccupied for a purpose hereinafter made apparent. Said kneading or flour board, which faces or is presented inward, therefore adapted to be effective or available for use when the top or closure is inverted or in open position, has preferably arranged along one longitudinal edge thereof and at its ends longitudinal pieces or strips $3^d$ $3^{dd}$, suitably secured edgewise to said board and connected one to the other, preferably by angle or corner castings or couplings $3^e$. Said strips or pieces project relatively beyond the face of said board and rest when the top is in closed position upon the corresponding pieces of the frame $1^c$, encompassing the upper part of the casing 1 below the upper end thereof, as before noted, which strips thus isolate said board from said upper end of the casing when the top is "down." The end pieces or strips $3^{dd}$ are equipped with studs or catches $3^f$ near their free ends, which are engaged by hooks $3^g$, applied to the end pieces of the upper frame $1^c$ for suitably securing the top or closure to the casing, as will be readily appreciated. In order to impart a finished appearance to the casing or cabinet at the upper rear edge thereof, it is provided at that point with a strip $3^h$, which is mitered to fit in between the free ends of the strips $3^{dd}$ when the top is down, which are correspondingly mitered for that purpose, said latter ends extending beyond the kneading or flour board. Leaves $3^{h'}$ are suitably hinged to the end pieces $3^b$ of the top 3 for conveniently extending the latter when in use, particularly as a kneading or flour board, for obvious purposes. Said leaves are upheld when in use by suitable "buttons" $3^i$, pivoted or swiveled to the under side of the top 3 and effective for that purpose.

A propping member or brace 4 is suitably hinged to the outer edge of the forward wall of the otherwise unoccupied portion of the recess $3^x$ in the top 3 for upholding said top when in open position or inverted, the lower end of said brace or prop when in use being received in a suitably-notched bracket or cleat 5, secured to the outer side of the door $1^{ab}$ for the retention thereof in place, as shown. When the top is down, the prop or brace 4 is "shut" into the space or recess $3^x$ flush with the outer surface of said top out of the way, said prop or brace being readily pried out of said recess when required for use by inserting the finger-tip into a notch $3^k$, suitably produced in said top adjacent to the free edge of said prop or brace.

I claim—

1. A cabinet of the character described, having a compartment-chamber, one compartment being provided with a bottom door hinged to the cabinet and an upper door also hinged to the cabinet for covering the entrance-opening of both compartments for the purpose set forth.

2. A cabinet of the character described, having a compartment-chamber, one compartment being separated by a partition from the other and having a bottom member secured to said partition and to the walls of said compartment, chamber, and doors hinged to the cabinet both controlling access to one of said compartments and one of said doors effective for controlling access to both of said compartments.

3. A cabinet of the character described, having a chamber for storing purposes, a bottom section or door hinged to the cabinet and a second door having its bottom edge arranged immediately above the latter door, both effective for controlling access to said chamber as set forth.

4. A cabinet of the character described, comprising a hinged combined top and flour-board having a recess or chamber opening out through its top surface, and a prop or brace hinged to said closure or top and adapted to be received in said recess when said closure is "down" and effective when the latter is in open position to uphold it for use as a flour or kneading board.

5. A kitchen-cabinet, having a compartment-chamber one compartment adapted for storing a barrel of flour or food supplies, and opening clear through to the floor for the purpose stated, and doors each hinged to the cabinet, and the two adapted to close the entrance-opening to the compartment noted.

In testimony whereof I affix my signature in presence of two subscribing witnesses.

OSCAR GOODWIN.

Witnesses:
J. HOWARD WIGHT,
J. A. LA ROCHELLE.